(No Model.) 2 Sheets—Sheet 1.
F. SCHEIER.
WATER CLOSET.
No. 367,065. Patented July 26, 1887.
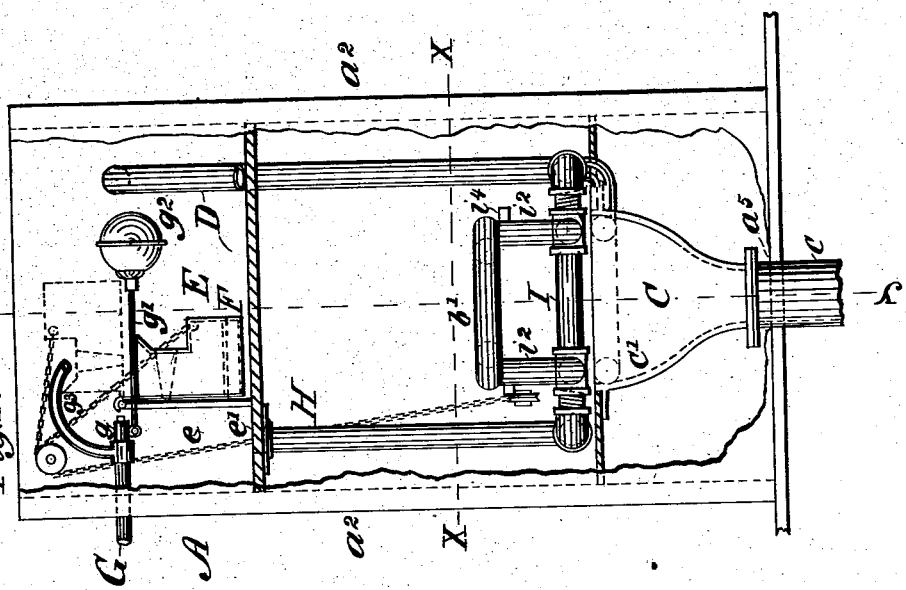
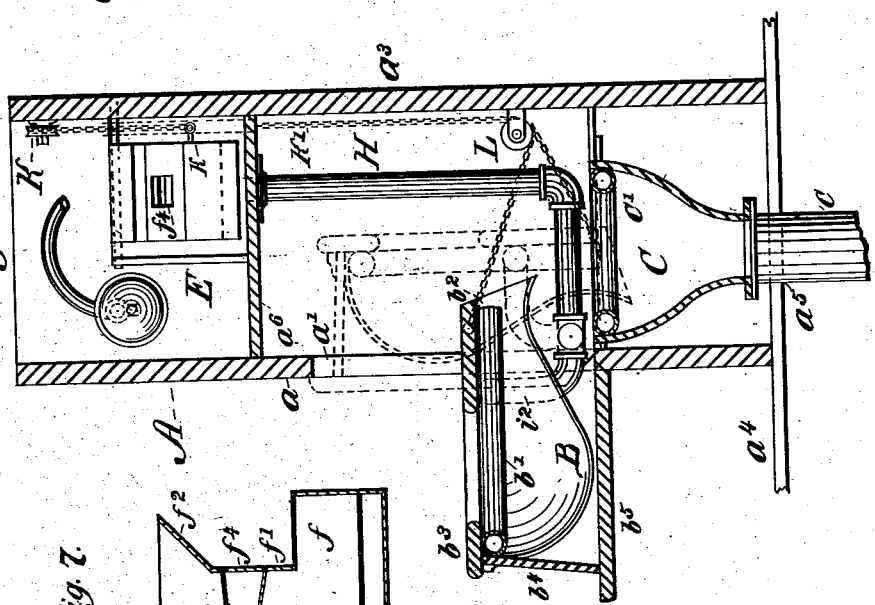
WITNESSES:
Rich'd M. Nake
Emil Kasper
INVENTOR
Frank Scheier
BY Rich'd H. Manning
ATTORNEY (No Model.) 2 Sheets—Sheet 2.
F. SCHEIER.
WATER CLOSET.
No. 367,065. Patented July 26, 1887.
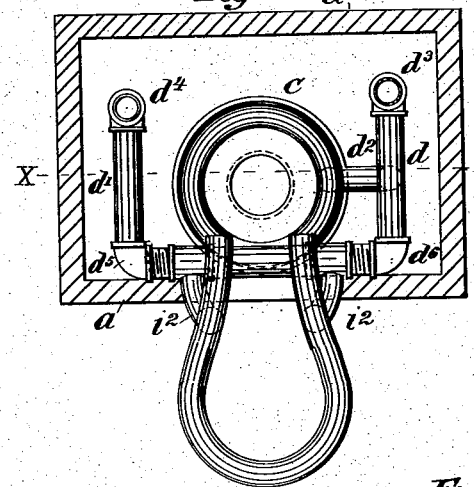
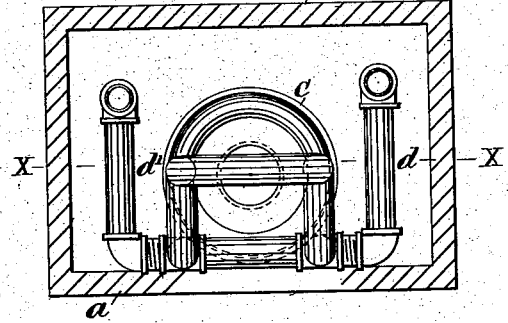
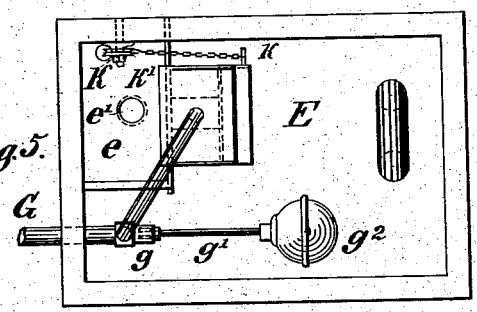
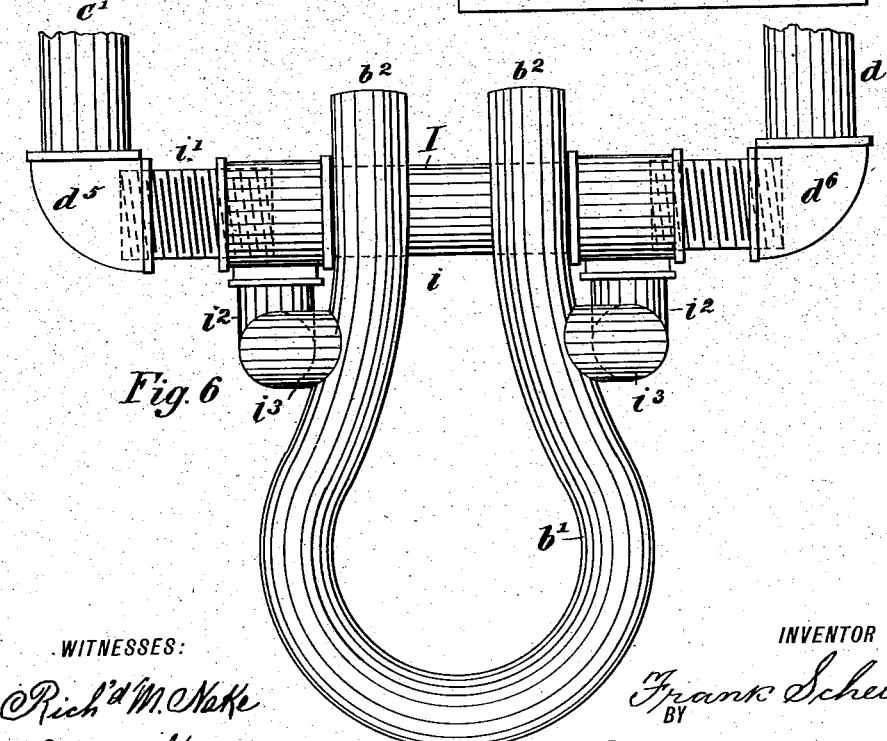
WITNESSES:
Rich'd M. Nake
Emil Kasper
INVENTOR
Frank Scheier
BY
Rich'd H. Manning
ATTORNEY

UNITED STATES PATENT OFFICE.

FRANK SCHEIER, OF KANSAS CITY, MISSOURI.

WATER-CLOSET.

SPECIFICATION forming part of Letters Patent No. 367,065, dated July 26, 1887.

Application filed June 1, 1886. Serial No. 203,785. (No model.)

*To all whom it may concern:*

Be it known that I, FRANK SCHEIER, a citizen of the United States, residing at Kansas City, in the county of Jackson and State of Missouri, have invented certain new and useful Improvements in Water-Closets; and I do hereby declare that the following is a full, clear, and exact description of the invention, which will enable others skilled in the art to which it appertains to make and use the same, reference being had to the accompanying drawings, forming a part of this specification.

My invention has for its object, in a system of water-distribution for water-closets, a folding water-closet bowl and water-supply tank so combined that the action of opening the bowl will automatically flush and fill the bowl, and the action of closing or folding the bowl will also automatically flush the bowl and also the receiver, while at the same time a uniform supply of water is self-regulated in the tank; and it consists in the novel means and mechanism hereinafter fully described, and pointed out in the claims.

In the drawings, Figure 1 is a front elevation of the water-closet, with the receiver and tank in section, showing the flushing-pipes detached from the bowl and in a folding position, and also the overhead water-tank and self regulating and distributing water appliances. Fig. 2 is a vertical side and sectional elevation of the water-closet at right angles to Fig. 1, showing the bowl in an open or horizontal position, and also the water tank and bucket and end view of funnel. Fig. 3 is a transverse sectional view, taken on the line $x\ x$ of Fig. 1, showing the bowl in open position. Fig. 4 is a similar view to that shown in Fig. 3, showing the flushing-pipes detached from the bowl and in a closed position. Fig. 5 is a plan view of the water-tank, showing the position of the separate receptacle therein. Fig. 6 is an enlarged plan view of the bowl-flushing pipes, showing the hinge-joint. Fig. 7 is an enlarged side view of the dumping-bucket, and showing the funnel extending through the same.

Heretofore in the flushing of the bowl a stop-cock has been arranged over the bowl and turned off and on, as needed, by the hand. This arrangement, not only being inconvenient but liable to waste the water, is entirely overcome in my invention, and a supply of water furnished which shall be equal to the demand and in the proper quantity.

In the construction of my invention I make a closet, A, to support the tank and bowl with a front, $a$, of sufficient width, in which I make an opening, $a'$, the proper height and width to receive, and into which may be folded or inclosed from sight, the water-bowl B.

$a^2\ a^2$ are the sides of the closet, which are placed so far apart as to accommodate the length of tank and permit the water appliances to be inclosed thereby.

$a^3$ is the back of the closet or wall, against which the tank abuts.

Within the closet A, and supported by the floor $a^4$, is placed the receiver C, and an opening, $a^5$, is made through the floor $a^4$ and under the receiver C, through which extends the waste-pipe $c$, which pipe is connected directly to the bottom of the receiver C, and carries off the waste water from the bowl to the sewer.

The receiver C, I make with a flushing-rim pipe, $c'$, extending around the inner side, as hereinafter described, and near the top thereof, and suitably perforated. A sufficient height above the receiver C to permit the folding of the bowl B, I arrange transversely within the closet A the open tank E. Said tank E extends from one side $a^2$ to an opposite side $a^2$ of the closet A, and from the point $a$ to the back or wall $a^3$, and is of a suitable height to contain the amount of water required, and is provided with a bottom, $a^6$.

From the flushing-rim pipe $c'$ of the receiver C, at one side, extends a pipe-joint, $d^2$. Upon opposite sides and a slight distance above the flushing-rim $c'$ of the receiver C, and arranged in a horizontal position extending from the front inner side of the closet A a suitable distance toward the back $a^3$, are the pipes $d\ d'$. The pipe $d'$, which is attached to the flushing-rim $c'$ of the receiver, is curved upwardly and connected beneath and to the horizontal pipe $d$. To the end of the said pipe $d$, toward the back of the closet, I attach an elbow-joint, $d^3$, and extending vertically therefrom is a siphon, D. Said siphon D extends through the bottom $a^6$ of the tank E, near one side of the closet A, and a tight joint is formed around said siphon to prevent leakage, after which the upper end is bent over at the high-water point in the tank, and the extreme end opening within and near the bottom of said tank E. I then partition off the farther end of the tank E upon the side of the closet opposite that having siphon D. Said partition extends from the back of the tank or from the wall $a^3$ a little over half-way toward the front of the closet, and also from said point at right angles to the end of the tank toward the side $a^2$ of the closet, thus making a smaller separate open water-receptacle, $e$, in the tank, which is properly lined with suitable material and made water-tight. I then make for the tank E a water-dumping bucket, F. Said bucket I make from proper material of a width slightly less than the length of the receptacle $e$ and nearly of the same height. Said bucket I form in shape of an elbow-joint, the lower open portion, $f$, extending at right angles to the upper portion, the lower portion being closed to hold the water. Upon the upper open end I form a flaring rim, $f^2$, extending obliquely above the bucket and above the projecting lower portion, $f$, of said bucket. Thus it will be seen that the face $f^3$ of the bucket presents a smooth vertical side of the receptacle $e$ of the tank. Through the upper portion, $f'$, of the bucket F, and in a transverse relation thereto, I insert a funnel, $f^4$, which is made to fit and prevent leakage from the bucket. This funnel $f^4$ is placed in the bucket F beneath the flaring rim $f^2$, and made larger at this point and tapering toward the opposite side of the bucket, and is not in connection with the interior of the bucket. I then hinge the upper end of the bucket upon a side opposite to that having the flaring rim $f^2$ by means of the hinge $f^5$. I then extend through the side $a^3$ of the closet A, and horizontally in line with the top edge of the tank E, a supply-pipe, G, which is connected with the hydrant or suitable water source. To the end of the supply-pipe G in the tank E is secured a stop-cock, $g$, and from the cock $g$ extends a rod, $g'$, and upon the end of the rod opposite its attachment to the stop-cock is attached a hollow ball, $g^2$, thus forming a ball stop-cock, which, when the tank is supplied with water, floats thereon. The supply-pipe G and ball stop-cock extend in the same longitudinal direction, entering the tank upon one side of the receptacle $e$ and extending toward siphon D.

Within the tank, and extending upward from the supply-pipe G, is a curved pipe, $g^3$, and arranged so that when the bucket F is raised in a horizontal position the open end of said pipe $g^3$ is brought opposite the funnel $f^4$ in said bucket. To compel the bucket F to sink into the water in the tank E, I make a separate compartment, $f^6$, in the bottom of the bucket, between which and the bottom of the bucket I fill with sand or any other heavy material. I then make an opening, $e'$, through the bottom of the tank E within the receptacle $e$, and attach one end of a first-flush pipe, H, forming a tight joint with the receptacle, and extending downwardly to and connected at its opposite end with the horizontal pipe $d'$ by means of the elbow-joint $d^4$.

Upon the ends of the horizontal pipes $d\ d'$ opposite that having the elbow-joints $d^3\ d^4$, I attach the elbows $d^5\ d^6$, and to said elbows $d^5\ d^6$, and at right angles to the horizontal pipes $d\ d'$, I attach a short rotating hinged pipe, I, which has a central transverse partition, $i$. To give the pipe I the adaptability of a hinge when connected with the bowl D, I fit within either end of the pipe I a short section of pipe, $i'$, which is screw-threaded outwardly its entire length, and the pipe I is made slightly shorter in length to give room for attaching of said sections on both ends. Each section of pipe $i'$ is fitted to the elbow-joints $d^5\ d^6$, and made sufficiently water-tight. In place of sections of pipe $i'$, I may use a ball-joint, as preferred, or any suitable joint that permits the passage of water to the bowl.

From beneath and on either end of the pipe I, I connect the short curved pipes $i^2\ i^2$, which extend from one side of said pipe I upwardly, and are connected beneath with the rim-pipe $b'$ of the bowl B. These pipes $i^2\ i^2$ may, however, be supplied with elbows $i^3\ i^3$ where they connect with the rim-pipe $c'$ of the bowl, as shown in Fig. 6, if preferred.

The rim-pipe $b'$ of the bowl B extends around the front of the bowl, and then branches from the sides of said bowl in two extended closed end portions, $b^2\ b^2$, in rear, or nearly to the dumping end of said bowl, which extends over and in rear of the hinge-pipe I. The bowl B and its rim-pipe $b'$ being attached to the hinged pipe I, as described, I then place thereon the seat $b^3$, which is secured by screws to the rim-pipe $b'$, and inclose the bowl by the front vertical face-piece, $b^4$, and the bottom piece, $b^5$, so that when the bowl is in a vertical position the bottom piece, $b^5$, closes the opening $a'$ in the closet A.

In the closet A, and to the back or wall $a^3$ a suitable height above the tank E, I attach a pulley, K. I then attach to the side and the lower elbow-formed portion of the bucket at $k$ a chain, $k'$, which is carried over the pulley K, and thence downwardly to and around the pulley L on the wall $a^3$ above the receiver C, and connected with the rear end of the seat $b^3$ within the closet by a suitable staple or other convenient device.

In the operation of my invention the tank E, as shown in Fig. 1, is represented as containing a full supply of water, and the bowl B folded into the closet A, and the bucket at the bottom of the said tank. When it is desired to use the bowl B, the bottom portion, $b^5$, and the said bowl is thrown into a horizontal position, and a lug, $i^4$, which is cast on the side of the curved pipe $i^2$, comes in contact with the front portion, $a$, of the closet and serves to sustain the weight placed on the said seat $b^3$ and bowl. This action also draws upon the end of the chain K at the bucket F in the tank E in a horizontal position, and the contents of the bucket are discharged into the receptacle e, the water passing through the first-flush pipe, H, and into the bowl through the hinge-joint, the partition i in which preventing the flow of water longitudinally through said pipe, while it affords a free unobstructed passage to the bowl. The discharge of the contents of the bucket into the water-receptacle e displaces an equivalent amount of water in the tank E, and consequently the ball g*, attached to the stop-cock, falls with the water to a lower water-line. The water in the siphon D is also on the same level, and an air-space is formed in the neck. The bowl is then supplied by the first flush with sufficient water. The action of displacement of the water by the bucket and the fall of the ball opens the stop-cock g, and a current of water instantly flows into the tank through the funnel $f^4$ in the bucket F, which comes opposite thereto and continues until the water has reached the high-water point, when the cock is shut off by the ball. I now close or fold the bowl into the closet A, and this action drops the weighted bucket again into the tank, which increases the rise of the water above high-water point and forces the air from the siphon and a complete siphonage is formed, which continues until the water in the tank is discharged through the siphon, and an afterflush given to the bowl, which not only carries off the paper remaining in the neck of the bowl, but flushes the receiver. Thus it will be seen that two important results are obtained—the first flush of the bowl and the afterflush, which removes all odor from the closet and thoroughly cleanses the receiver-bucket. The action of the siphon will empty the tank, and to break the siphonage the bucket as it falls into the empty tank receives the flow of the water from the supply-pipe, the time in which it takes to fill the bucket enabling the siphonage to be broken, (otherwise the siphon would continue to draw water from the tank,) and once broken the water continues to flow into the tank until it has again reached high-water mark and the water-bowl is again used.

The means which I introduce to connect a flush-rim folding water-receptacle with a water-way hinge enables me to supply the receptacle with water from the rim, and also carry away the scum on the inner sides of said receptacle, and the obvious advantage of a dumping-bowl with flush-rim being to wash all parts while open or closed.

My invention is applicable to wash-stands, bath-tubs, and similar receptacles, and by means of the water-conducting hinge I am enabled to reach the bowl direct and automatically supply the water in suitable quantities.

Having fully described my invention, what I now claim as new, and desire to secure by Letters Patent, is—

1. In a system of water-distribution for water-closets, an overhead tank having separate compartments, a receiver for the waste, and a folding water-receptacle, water-conducting pipes connected with one of said compartments and said folding receptacle, and water-conducting pipes connected with an opposite compartment and the said receiver, and water-dumping apparatus in one compartment of said tank and in communication with an opposite compartment, and suitable elevating devices connected with said dumping apparatus and the said folding water-receptacle, for the purpose described.

2. In a system of water-distribution for water-closets, an overhead tank having separate compartments, a receiver for the waste, having a flushing-rim, and a folding water-receptacle provided with a flushing-rim, water-conducting pipes connecting one of said compartments with said flushing-rim of said folding receptacle, and a siphon connecting an opposite compartment with the flushing-rim of the said receiver, water-dumping apparatus in a compartment provided with the said siphon and in communication with an opposite compartment, and suitable elevating devices connected with the said dumping apparatus and the said folding receptacle, for the purpose described.

3. In a system of water-distribution for water-closets, an overhead tank having separate compartments, a receiver and a folding water-receptacle, water-conducting pipes connecting said tank with said receiver and the said folding water-receptacle, and a water-dumping bucket suitably weighted in one compartment of said tank, and in communication with an opposite compartment, and a siphon extending into one compartment of said tank and connected with the said folding receptacle and the said receiver, and suitable elevating devices connected with the said folding receptacle and the said bucket, for the purpose described.

4. In combination with the receiver of a folding water-dumping bowl in communication with said receiver when folded, and provided with a flushing-rim pipe and a water-way hinge, water-conducting elbow-pipes attached to said water-way hinge, and also to said flushing-rim pipe of said bowl, for the purpose specified.

5. In water-closets, the combination, with an overhead tank having separate compartments, of a water-dumping bucket suitably weighted, hinged to said tank in one compartment, and in communication with an opposite compartment, a supply-pipe for said tank, a ball stop-cock to said supply-pipe in said tank, a folding water-receptacle, and elevating devices connected with said bucket and said folding water-receptacle, a receiver, and water-conducting pipes connected with one of said compartments and the said folding receptacle, and a water-way hinge connecting said folding water-receptacle with said water-conducting pipes, for the purpose specified.

6. In water-closets, the combination, with an overhead tank having separate compartments, of a water-dumping bucket suitably weighted and hinged to said tank in one compartment and in communication with an opposite compartment, a supply-pipe for said tank, and a ball stop-cock connected with said supply-pipe in said tank, a folding water-dumping receptacle or bowl having a flushing-rim pipe, a water-conducting pipe connected with the said water-receptacle and said flushing-rim pipe, and an intermediate water-way hinge connecting said conducting-pipe with said folding water-receptacle and the said rim-pipe, suitable pulleys attached to said closet, and a chain attached to said bucket and running over said pulleys, and also attached to said folding bowl, substantially as and for the purpose described.

7. A dumping-bucket for water-tanks having a funnel extending therethrough, as and for the purpose described.

8. The combination, with the tank, of a separate water-receptacle in said tank, and a bucket hinged to said tank and provided with inclosing sides and bottom, and a funnel extending through said sides, a weight in the bottom of said bucket, and a stationary supply-pipe extending over said bucket and in direct line with said funnel when said bucket is elevated, as described.

FRANK SCHEIER.

Witnesses:
FRED. W. PERKINS,
JAMES H. PRESTON.